United States Patent [19]

Robinson

[11] 3,927,111

[45] Dec. 16, 1975

[54] PRODUCTION OF CARBONYL COMPOUNDS

[75] Inventor: James V. Robinson, Chillicothe, Ohio

[73] Assignee: The Mead Corporation, Dayton, Ohio

[22] Filed: Dec. 8, 1971

[21] Appl. No.: 206,127

[52] U.S. Cl. ... 260/604 AC; 260/497 A; 260/533 R; 260/586 P; 260/590; 260/597 R; 260/597 B; 260/604 R; 261/94
[51] Int. Cl.² ............... C07C 45/04; C07C 27/16; C07C 51/32; C07C 67/00
[58] Field of Search...... 260/604 AC, 597 B, 597 R, 260/604 R, 497 A, 533 R, 586 P, 590; 261/94, 95, 96, 97, 98

[56] References Cited
UNITED STATES PATENTS

| | | | |
|---|---|---|---|
| 3,277,159 | 10/1966 | Schaeffer | 260/604 AC X |
| 3,346,624 | 10/1967 | Schaeffer et al. | 260/604 AC X |
| 3,450,748 | 6/1969 | Shaeffer | 260/604 |

FOREIGN PATENTS OR APPLICATIONS

| | | | |
|---|---|---|---|
| 938,835 | 10/1963 | United Kingdom | 260/604 AC |

*Primary Examiner*—Norman P. Morgenstern
*Attorney, Agent, or Firm*—Biebel, French & Bugg

[57] ABSTRACT

Preparation of carbonyl compounds from unsaturated olefin hydrocarbons is conducted in the presence of a catalyst system such as palladium chloride in an aqueous medium, a redox system such as cupric chloride using an oxidant such as oxygen or air in which the rate of reaction or throughput may be increased by use of a wetproofed Contacogen. Typical materials for use as a Contacogen include granular carbon wet-proofed with a fluorocarbon resin such as PTFE. By use of a Contacogen it is possible to increase the rate and/or throughput over that obtained without the use of a Contacogen even when the reactions are conducted at relatively low temperatures and pressures, e.g., below about 150°C and below about 5 atmospheres. Various catalyst and redox systems may be used and process parameters may be varied to produce various products, e.g., acetaldehyde from ethylene at low temperatures and pressure.

7 Claims, No Drawings

PRODUCTION OF CARBONYL COMPOUNDS

CROSS-REFERENCE TO RELATED APPLICATIONS

Reference is made to U.S. application Ser. No. 87,503, filed Nov. 6, 1970, now abandoned, and assigned to the same assignee.

BACKGROUND OF THE INVENTION

This invention relates to the oxidation of hydrocarbon olefins, and more particularly to oxidation of such materials in the presence of a catalyst system and a Contacogen. Specifically, the invention relates to an improvement in the processing of unsaturated hydrocarbon olefin gases by way of oxidation to produce carbonyl compounds in which either the rate of reaction is improved by the use of a Contacogen, or the reaction is carried out at relatively low temperatures and pressures and at reasonable rates.

PRIOR ART

It is known in the prior art that olefins may be treated to produce a variety of products. Typical of such processes is the "Consortium" or Wacker process generally involving the production of carbonyl compounds by the catalytic oxidation of an olefinically unsaturated hydrocarbon in an aqueous medium.

For example, Canadian Pat. No. 625,138 of 1961 describes production of acetaldehyde from ethylene, and ketones and higher aldehydes from unsaturated hydrocarbons having one or more double bonds. The catalyst is an aqueous solution of a platinum metal compound and usually contains salts of multivalent metals.

In a typical Wacker process oxidation, ethylene is oxidized to acetaldehyde in a dilute hydrochloric acid solution containing chlorides of palladium and copper. Initially, an ethylene-palladium chloride complex is formed which, when hydrolyzed, yields acetaldehyde and palladium metal. Cupric chloride is used to oxidize the palladium metal to the plus two state forming cuprous chloride which is then oxidized to the cupric state with oxygen or air. There are two basic variations on this process, the one stage process, in which all oxidation-reduction reactions take place in one reactor, and the two stage process, in which after oxidation of ethylene, the catalyst is separated and reoxidized and returned to the reactor. Acetaldehyde is recovered by scrubbing and yields are about 95 %.

Other related processes for the production of carbonyl compounds from the corresponding olefins, e.g., aldehydes, ketones and acids from the corresponding unsaturated hydrocarbon, are as set forth in U.S. Pat. No. 3,076,032 of 1963, in which the reacting system includes an oxidizing agent, a liquid catalyst in water having an acid to neutral reaction, and a compound of the noble metals of Group VIII and a redox system. Variations of this process include, contacting the olefin and oxidizing agent separately with the liquid catalyst, using between 1 and 10% oxygen based on olefins; contacting the olefins with oxygen and water in vapor form and using a solid catalyst plus a redox system. The yields of acids may be increased when the catalyst is a solid in the acid to neutral pH range and contains a carrier of a noble metal of Group VIII (Pd, Ir, Ru, Rh, Pt), and a redox system containing Fe, Mg and/or Co, or combinations. Moreover, dilution of the hydrocarbon with carbon monoxide and/or hydrogen is said not to adversely affect the reaction.

Other variations include use of oxygen and an inert gas and a redox system in which the metal component is at least monovalent in the reduced state, e.g., Co, Fe, Cu, Ni, Mn, Hg, Ce, Ti, U, Bi, Tl, Sn, Pb, Cr, V, Mo, Sb, and mixtures thereof. Where copper catalysts are used, the molar ratio of copper to chlorine should be in the range of 1:1 to 1:2 and preferably 1:1.4 to 1:1.8 calculated on the basis to include halogen added as iron halide or halides of cations which do not form neutral reacting salts with hydrohalic acids.

The addition of quinone which has been solubilized, e.g., substitution with sulfonic acid or carboxylic groups, is said to increase the rate of reaction, especially if present in an amount of up to 10% based on catalyst weight. An active oxidizer of the ozone, peroxide, persulfate, perborate, percarbonate, compounds of nitrogen, halogen-oxide compounds, and the like, as known in the art, facilitates the reformation of the higher oxidation state of the catalyst. The ratio of the sum of redox metals to noble metal is in the range of 15:1 to 500:1.

Where solid catalysts are used, they are supported on carriers such as $TiO_2$, active carbon, silica gel, silicates and the like. In any event, the pH is preferably controlled to between 0.5 to 6 or neutral, it being desirable to keep the pH of the system on the acid or neutral side.

Other patents of interest are U.S. Pat. Nos. 3,104,263 and 3,119,875 which disclose formation of carbonyl compounds from olefinic hydrocarbons of 2 to 8 carbons; U.S. Pat. No. 3,118,001 relating to the use of trichloroacetic and/or diabromoacetic acids, salts and mixtures; U.S. Pat. Nos. 3,087,968; 3,301,905 and 3,493,044.

U.S. Pat. No. 3,378,590 of 1968 discloses a process for the production of carbonyl compounds from olefins, carbon monoxide and hydrogen using a cobalt catalyst and a promoter of platinum or palladium, supported on carbon or activated carbon capable of passing through a 300 mesh screen.

U.S. Pat. No. 3,253,020 describes oxidation of unsaturated olefins to unsaturated esters under relatively mild conditions of temperature and pressure in which the amount of water in the reaction zone does not exceed 10% by weight of the liquid reactants.

Other patents of interest include U.S. Pat. No. 3,277,158, dealing with production of vinyl acetate; U.S. Pat. Nos. 3,288,845 and 3,346,623 dealing with the use of an anion exchange solid to prevent a build up of solids in the distillation zone; U.S. Pat. No. 3,346,624 relating to the use of inert solids in the reaction zone, e.g., solids of high surface area and from 3 to 10 mesh in size; U.S. Pat. No. 3,381,030 relating to the formation of alpha, beta unsaturated acids from olefins wherein the solvent system contains less than 1% water; U.S. Pat No. 3,346,625 relating to the use of dehydrated molecular sieves in carbonylation of olefins; U.S. Pat. No. 3,511,880 relating to the use of a Group VIII noble metal biphyllic liquid complex as a catalyst; U.S. Pat. No. 3,444,189 relating to the production of vinyl acetate and acetaldehyde from olefins in which the acetaldehyde is oxidized to acetic acid from butene; U.S. Pat. No. 3,509,209 relating to the production of carboxylic acids and lactones from conjugated diolefins, e.g., adipic acid from butadiene.

Of particular interest is U.S. Pat. No. 3,450,748 of 1969 which relates to the production of vinyl acetate from ethylene by direct oxidation in the presence of catalyst solution including aqueous acetic acid, a Group VIII noble metal, and a soluble chloride or bromide. The temperature is in the range of 30° to 300°C at pressure greater than 10 atm and up to 100 atm or more. The products of reaction are acetic acid, acetaldehyde and vinyl acetate, and the yield can be varied by varying the process parameters. For example, the noble metal is used in amounts between 0.001 and 5% by weight of the liquid reaction medium, and the halide should be present between 0.05 and 5.0 weight percent of the liquid reaction mixture. Decreasing the halide favors vinyl acetate production, and increase in the halide decreases vinyl acetate and increases acetaldehyde. Vinyl acetate is favored by use of less than about 5% $H_2O$ and the presence of acetate ions; maximum acetaldehyde production occurs at 10–20% $H_2O$; acetic acid production is at a maximum at between about 20 to 70% $H_2O$.

Most recently, oxidation of olefins has been conducted in the presence of a carbollyl complex of a Group VIII metal, see U.S. Pat. No. 3,547,984 of 1970. Suitable olefins are those of 2 to 25 carbons which are oxidized to provide aldehydes, ketones, carboxylic acids, ketals, and the like as described in this recent patent which also describes the various conditions.

DESCRIPTION OF THE PRESENT INVENTION

The principles of the present invention are applicable to the prior art procedures for oxidation of olefins to carbonyl compounds by catalytic oxidation under the conditions stated. The present invention is particularly useful in the conversion of ethylene to acetaldehyde in aqueous media and at low temperature and pressure, although, as is known in the art, reaction conditions may be varied to favor one product in preference to another.

Specifically, the present invention finds particular use in Wacker process and related procedures in which olefinically unsaturated hydrocarbon gaseous starting materials are oxidized to carbonyl compounds, and especially those procedures employing relatively low temperatures and pressures and conducted in aqueous media.

By use of a Contacogen, as with the present invention, it is possible to increase the rate of reaction over that achieved using the same reaction conditions absent a Contacogen, and in the case of short runs, some elements of the catalytic and/or redox system may be eliminated while maintaining or improving the rate.

Thus, a Contacogen is used and contacted simultaneously both by the gaseous olefin and/or the catalyst system which is preferably a homogeneous catalyst in an aqueous medium and which forms the reaction mixture. It is important in carrying out the present invention that the hydrocarbon gas, the oxidant and the catalyst system contact each other and the Contacogen since it is believed that improved results are achieved by virtue of this simultaneous contact of the reactants.

Accordingly, it is a primary object of the present invention to provide an improved procedure for the production of carbonyl compounds by the oxidation of unsaturated olefin hydrocarbons.

Another object of the present invention is to provide an improved process for the production of carbonyl compounds from the corresponding olefinically unsaturated hydrocarbon by use of the Wacker process in which the rate of reaction is substantially increased by the use of a Contacogen, as described.

Another object of the present invention is the provision of an improved process for the production of acetaldehyde from ethylene using a palladium chloride catalyst and a cupric chloride reoxidizing agent and a Contacogen which is wetproofed whereby the rate of reaction is increased appreciably.

Another object of this invention is to provide an improved novel process conducted at relatively low temperature and pressure in which unsaturated olefins are converted to corresponding carbonyl compounds by the use of a Contacogen which improves the rate of production of desired product over that achieved when the same reaction is conducted in the absence of a Contacogen, especially if the reaction is conducted in an aqueous medium.

DETAILED DESCRIPTION OF THE INVENTION

Among the various starting materials convertible into carbonyl compounds are unsaturated olefin hydrocarbons of from 2 to 25 carbons such as ethylene, propylene, butene-1, butene-2, pentene-1, pentene-2, hexenes, heptenes, isoocetene, octene-1, 3-ethylpentene-1, nonene-3, decene-1, licosene, heptadecene-1, pentacosene, docosene, butadiene, pentadiene, octadiene, cyclopentene, methylcyclopentene, butylcyclopentene, cyclohexene, styrene, alkenyl benzenes, indene, vinylnapthalene, butenylnapthalene, and the like. The preferred olefins are those having 2 to 6 carbons and especially ethylene, propylene and the butenes. By far and away the largest use is of ethylene and in its conversion to acetaldehyde. Other products include acetic acid and vinyl acetate, depending on the conditions of reaction. Normally, propylene yields acetone, butene-1 or butene-2 yields methyl ethyl ketone, while butadiene yields a mixture of crotonaldehyde, acrolein, and proprionaldehyde. $H_2S$ may be stripped from the feed stock by any of several methods, see for example U.S. Pats. Nos. 3,249,522; 3,409,520 and application Ser. No. 87,504, filed Nov. 6, 1970, assigned to the same assignee.

The present invention finds particular use in the conversion of ethylene to acetaldehyde in the presence of an aqueous medium wherein the reaction is conducted at reasonably low temperatures and pressures. Of interest is the conversion of the lower homologues and analogs of ethylene to corresponding carbonyl compounds. These reactions are per se known in the art, and the advantages of the present invention derives from an increase in rate, a simplification of the catalyst and redox systems as well as specificity of product, or a combination thereof.

In the traditional Wacker process, the reaction system includes an unsaturated olefin, e.g., ethylene, an oxidant, i.e., air or oxygen, a catalyst system, e.g., palladium chloride, usually in aqueous hydrochloric acid, the catalyst undergoing a reduction to a lower valence state, i.e., palladium chloride to palladium metal. To bring palladium back to the plus two valence state, the metal is oxidized by a material such as cupric chloride which in turn is reduced to the cuprous state and which must then be oxidized to the cupric state. The redox system, accordingly, generally refers to those reactants involved in the oxidation of the catalyst, and which are then reduced.

Typical catalysts include platinum metal compounds such as platinum, palladium, ruthenium, rhodium and iridium, of which palladium is preferred. These materials may be present as the halides, sulfates, phosphates or acetates, and preferably as chlorides or acetates. It will be apparent to those skilled in the art, that the catalyst systems previously described in the prior art also find utility, and the present invention may be carried out with the redox systems heretofore described and in the prior art. It should be noted, however, that a redox system is not essential to the present invention, as will be described hereinafter.

In its simplified form, the present invention involves the use of a Contacogen in the conversion of an unsaturated olefin to a carbonyl compound. As presently understood, the Contacogen is believed to play a role in formation of the olefin-catalyst complex as well as the regeneration of the catalyst to the proper valence state, and the regeneration of the redox compound, if one is present.

The use of a Contacogen is an essential aspect of this invention and it operates to increase the rate of product formation and it may affect the relative proportion of product formation where multiple products are formed such that one product is produced in an amount greater than or at a rate faster than can be achieved without the use of a Contacogen.

Thus, in accordance with this invention the hydrocarbon olefin, the oxidant and the catalyst system are simultaneously brought into contact with the Contacogen and into contact with each other, and preferably minimizing the contact of the hydrocarbon and oxidant with the catalyst except at the locus where both are in contact with the Contacogen.

An important aspect of the present invention is preventing the Contacogen from being in exclusive contact with only one of the reacting phases. When used in describing this invention, the term "flooded" means that the Contacogen is in exclusive contact with either one, e.g., the liquid, or the other, e.g., the gaseous, of the reacting phases. If the Contacogen of the present invention is flooded, the increase in rate of product formation is not achieved.

The procedures and system of the present invention involve a basically new concept and mode of operation in preparation of carbonyl compounds and an improvement in preparation of carbonyl compounds by oxidation of unsaturated olefins. Classically, the Wacker process is built around the provision of a continuous process for the formation of carbonyl compounds by the reoxidation of the catalyst system to the active state, and reoxidation of the redox system to an active state. The initial reaction of the olefin with the catalyst to form the complex only indirectly involves oxidation even though the literature speaks in terms of oxidation of the unsaturated olefin. See Chemistry and Industry, Jan. 13, 1962, pages 54–61 by J. Smidt. In the so-called one stage continuous process all of the oxidation reduction reactions take place in one reactor, and the Contacogen of the present invention used therein takes part simultaneously in several reactions. It is believed that the rate limiting step is the reoxidation of the redox system, and this step is said to be the velocity determining step, see U.S. Pat. No. 3,076,032. Where a redox system is used, the present invention not only increases the rate of the velocity determining step, but also improves the rate of catalyst reoxidation and appears to participate in the olefin/catalyst complex formation. Thus, even in the so-called two stage process, where the spent catalyst is separately regenerated in a separate reactor by air, or oxygen, the Contacogen of this invention improves the separate reactions. In the two stage process, oxygen containing gases are not generally used in the first stage, and thus the reaction mixture is the catalyst, the medium in which the catalyst is dispersed and a gaseous olefinic reactant.

Accordingly, the reaction in the first stage of a two stage process involves a gas (the olefin) and a catalyst in a liquid medium, and the reaction in the second stage also is a gas (oxygen or air) and a liquid medium. In a single stage process the reaction involves two gases, e.g., olefin and oxidant and a liquid medium. These types of reaction conditions are especially suited for Contacogen use because the reaction involves the controlled contact of a liquid phase and a gas phase made up of one or more gases in which the contact between reactants is primarily at an interface of the Contacogen and the gas and the liquid, the latter coincidental contact being an essential aspect of the system of this invention. This coincidental controlled contact is in contradistinction to intermixing of the reactants as bubbles of gas in a liquid, as by a diffuser, because the reaction is carried out at that locus of contact between the liquid, the gas, and the Contacogen. For the purpose of simplification, the following terms have been developed to identify the process of this invention and the essential elements thereof.

"Contacogen" means the solid material which forms the locus of the interfacial contact for the gas or gases and liquid and which should be simultaneously contacted by each of them to produce the desirerd reaction.

Since the reaction zone involves a gas and a liquid, or a mixture of gases and a liquid, and the Contacogen, the Contacogen must be in contact with the gas and wetted by the liquid but not flooded by either, or in contact with the mixture of gases and a liquid and not flooded by either. Wetted, as used here, means that the contact angle between the Contacogen and the liquid is low, e.g., less than about 90° and approaching zero. If the contact angle is high, e.g., greater than about 90° and approaching 180°, then the liquid will tend to draw away from the surface of the Contacogen, and the surface of the Contacogen is in effect in substantial contact only with the gas, that is, "flooded" by the gas. On the other hand, with the surface of the Contacogen readily wetted by the liquid, that is, with a contact angle approaching zero between the Contacogen surface and the liquid, the liquid will tend to cover the surface of the Contacogen, and the surface of the Contacogen is in effect in substantial contact only with the liquid, that is, "flooded" by the liquid. As a practical matter the primary source of flooding is the liquid medium present. One method of preventing flooding by the liquid is by treatment of the Contacogen which is designated as "wetproofing". This adds to the Contacogen a minor proportion of an inert substance not wetted by the liquid medium or liquid reactants, that is, the contact angle between this inert additive and the liquid is greater than about 90°.

The Contacogen in accordance with the invention, is a solid which is essentially inert with respect to the gas or gases, the liquid, and the products in the sense that it is not chemically attacked in the sense that it is not physically consumed or degraded. A material having a high surface-area-to-weight ratio is preferred because it furnishes greater interfacial contact. In addition, the Contacogen is structured to promote simultaneous contact with both the gas or gases and the liquid and may be in various physical forms to accomplish this purpose. In the case of a Contacogen in particulate form, the particles are structured to provide a large surface area, for example, the particles are individually non-porous solids of large surface area, or they may be structured to form larger particles which are porous. When the Contacogen is a plate or solid unitary member, as for example made by bonding particles together, the member is structured by maintaining porosity and large surface area. It will be apparent, accordingly, that various forms of Contacogen may be used, and various configurations may be employed. The Contacogen may be supported on a plate, or formed into a tube or plate. The Contacogen may be stationary or movable, e.g., a rotating tube. Whatever the form, the Contacogen should be, in addition to the qualities already discussed, structured to achieve a relatively high surface area and to promote simultaneous contact with the reactants.

In accordance with the present invention, the liquid system and the gas reactant or reactants are brought into contact with each other and with the Contacogen and maintained in the relation that the liquid and gas are in contact with each other in the same region where they are simultaneously in contact with the Contacogen. An important aspect of the present invention is preventing the Contacogen from being flooded by either the liquid or gas phase. If the Contacogen is flooded by liquid reactant, the liquid film slows considerably the rate of diffusion of the other reactant to the surface of the Contacogen. If the Contacogen is flooded by a gaseous reactant, the liquid reactant (catalyst and redox system) is prevented from reaching the surface of the Contacogen in the manner contemplated by the present invention. When operated in a non-flooded condition, as described above, the rate of product formation is increased, and where there are multiple alternative products, the relative rates of product formation may be altered.

In the case of porous materials used as a Contacogen, it will be understood that neither the liquid nor the gaseous reactants should be forced through the pores of the Contacogen in the sense that a porous member is used as a diffuser to form small bubbles of one reactant which are in intermixing contact with the other reactant.

Various solid materials may be used as a Contacogen and carbon, activated carbon, and plantinized materials are preferred. Of the above materials, carbon and activated carbon appear to provide optimum performance because of the relatively large surface-area-to-weight ratio obtainable, as well as the degree to which carbon may be finely divided. Moreover, this is a readily available material which may be obtained in a wide variety of particle sizes and surface areas. Carbons from different sources often result in different reaction rates. These variations are easily determined by simple procedures. Typical of the carbons useable in accordance with the present invention are carbon black, furnace black, channel black or carbons prepared by known procedures from various sources, for example, wood, corn cobs, beans, nut shells, bagasse, lignin, coals, tars, petroleum residues, bones, peat and other carbonaceous material.

The particle size may vary from 9 millimicrons to relatively large size, e.g., 1 inch or more, and usually the carbon is supplied as a mixture of various particle sizes. The surface area of the carbonaceous material may vary from 3 square meters per gram to in excess of 950 square meters per gram, as characterized by gaseous absorption using the BET method.

The carbon may be arranged in various physical arrangements, e.g., a porous carbon plate or tube wetproofed to prevent flooding, or a mass of wetproofed carbon granules or powder which float on the surface of the liquid; or a mass of wetproofed carbon granules or powder packed into a reaction vessel.

Carbon may be wetproofed as follows:

Polytetrafluoroethylene (PTFE) in emulsion form is intermixed with particulate carbon in an amount of between 0.1 to 100% based on carbon solids. The mixture is heated to remove the vehicle and dispersing agent for the PTFE. For further description of Contacogen and wetproofing, reference is made to Ser. No. 87,503, filed Nov. 6, 1970.

In accordance with this invention, apparatus for carrying out the reactions may take various forms. In the preferred form of this invention, the liquid phase is aqueous in nature, i.e., contains water at least to the extent of 10% by weight and preferably above 20% by weight. Such is preferred because it is easier to wetproof the Contacogen with respect to aqueous systems, whereas non-aqueous systems, and especially those reacted at high temperatures and pressures present practical problems in connection with wetproofing the Contacogen. It is interesting to observe that at above 20% $H_2O$ the primary product from ethylene is said to be acetaldehyde rather than acetic acid, see U.S. Pat. No. 3,450,748.

It is preferred that the temperature and pressure during reaction be maintained below those conditions which give rise to formation of vapor phase conditions in what should preferably be a liquid system. By way of example, temperatures below 150°C and pressures below about 5 atmospheres constitute a preferred form, although higher temperatures and pressures may be used as long as predominantly vapor phase conditions are not achieved.

The pH of the system is preferably maintained on the acid to neutral side, i.e., pH of 0.5 to 6.5 or neutral, with a ratio of the sum of the redox materials (if present) to noble metal of up to 500:1. When copper is used in the redox system, the molar ratio of copper to chlorine is preferably in the range of 1:1 to 1:2. The preferred aqueous medium on the acid side is obtained with hydrochloric acid although other mineral acids such as sulfuric and nitric may be used as well as organic acids such as acetic and the like, as well as mixtures thereof. The molar ratio of olefin to oxygen should be in the ratio of 2:1 but an oxygen deficiency is desirable for safety reasons, e.g., molar ratio of 2.5:1 to 4:1. With air, the olefin-air ratio may be in the range of 8:5 to 1:5.

A convenient form of apparatus for carrying out the invention is a column which contains wetproofed Contacogen, i.e., granular carbon wetproofed with PTFE. One of the aspects of the present invention relates to the pretreatment of the wetproofed Contacogen with respect to the catalyst system and redox system to be used. Where porous absorptive and adsorptive types of materials are used as a Contacogen, it is preferred to pretreat them, after wetproofing, with a solution of the catalyst and redox system, (if one is used), allow them to dry and then use them as described.

The column is loaded with wetproofed granular Contacogen, liquid catalyst system, and a redox system if one is used, and air or oxygen and olefin gas are continuously introduced into the column. If the liquid is flowing the flows of liquid and gas may be either concurrent or countercurrent. The liquid may be scrubbed to remove the product, or other procedure known in the art may be used. If a two stage process is used, the olefin is introduced into the column, a portion of the liquid catalyst system is removed and treated to separate the formed carbonyl compound, the residue being introduced into a second column containing a Contacogen similar to that in the first. In the second column the "spent" catalyst is reoxidized as is the redox system if one is used. The reoxidized catalyst is then introduced into the first column for reaction with the olefin. The system described may be operated on a continuous or batch basis.

For practical reasons, the oxidant is an oxygen containing gas such a oxygen or air, and for reasons of both safety and economy, especially in case of a single stage process, air is the preferred oxidant. The liquid reactant, may, if desired, include solubilized quinones as oxidants as described in U.S. Pat. No. 3,076,032. Other oxidizers may also be present such as ozone, and peroxide compounds such as hydrogen peroxide, sodium or potassium peroxide, ammonia and potassium persulfate, percarbonates, perborates, organic peroxides, oxygen compounds of nitrogen, such as nitrogen dioxide and the like.

While a variety of catalyst systems and catalyst conditions are known for use in the conversion of unsaturated olefin hydrocarbons, as mentioned supra, palladium chloride has been used most frequently, while cupric chloride is used in the redox system. In accordance with this invention, the Contacogen in the form of granular carbon wetproofed with PTFE represents a preferred form of wetproofed Contacogen. With this system, it has been observed that the palladium chloride is associated with the Contacogen and this offers several practical advantages. For example, in a two stage system or in the recovery of product, loss of catalyst is reduced. Very little, if any, leaves the olefin reactor. It is also recoverable from the Contacogen in the event of replacement of Contacogen.

It has been observed that some of the redox system is likewise associated with the Contacogen. Thus, in separating the catalyst, the Contacogen is dispersed in water, and chlorine gas is bubbled through the dispersion, for example in a column. The product formed is cupric chloride which is fairly soluble in water as compared to cuprous chloride, and which is conspicuous in the solution because of its blue color. Little, if any, palladium chloride is removed, even if the column is repeatedly filled with water, treated with chlorine gas, and the liquid drained. Recovery of the catalyst may be continued by gentle combustion of the carbon, which leaves an ash residue. The residue is easily soluble in aqua regia. The acidic solution is neutralized with concentrated ammonium hydroxide, quantitatively forming a precipitate of Pd $(NH_3)_2Cl_2$, which may be recovered by filtration. If there is need for further purification, this precipitate is redissolved by the addition of concentrated ammonium hydroxide, then reprecipitated by dilution with water and the addition of hydrochloric acid, followed by filtration. The recovered precipitate may be converted to palladium sponge by drying and ignition in a furnace, this ignition proceeding satisfactorily at temperatures in the range of 500° to 600°C. In this form, the palladium sponge may be accurately weighed. A solution of palladium chloride of any desired concentration, say five percent, is made by adding to the palladium sponge a measured quantity of water in which chlorine is dissolved, thereby dissolving the palladium and converting it to orange $PdCl_3$, which reverts either with time or warming to brown $PdCl_2$, by the loss of chlorine. This palladium chloride can then be used as the catalyst.

Typical examples of the process of the present invention are as follows:

EXAMPLE I

Acetaldehyde from Ethylene

The apparatus consisted of a bank of five reactors, identical in so far as known, operated simultaneously for comparative pruposes. Each reactor is formed of a straight Pyrex glass tube, 30 to 31 centimeters long and 21 to 22 mm. inside diameter, stoppered at each end with a Neoprene stopper. Through a hole in the bottom stopper of each reactor passes a glass tube, terminating just inside the reactor in a sintered glass gas-diffuser of cylindrical shape. Through two holes in the top stopper of each reactor pass the ends of a U-shaped glass tube through which cooling water flows, thereby forming a U-shaped reflux condenser extending about 35 mm. below the stopper into the reactor. Through a third hole in the upper stopper passes a glass thermometer reading from 0° to 100° C., extending about 10 to 12 cm below the stopper into the reactor. Through a fourth hole in the upper stopper of each reactor passes a glass vent tube about 22 to 23 centimeters long, extending approximately 5mm. below the stopper into the reactor, and bent twice to provide an offset of 35 to 55mm. The space between the gas-diffuser and the wall of the reactor tube is filled with glass spheres about 4mm. in diameter. Various granular packing materials are added to the several reactor tubes as described below, such packing supported by the top of the gas-diffuser and the glass spheres.

A T-tube is connected closely with the end of the inlet tube of the gas-diffuser, using rubber tubing. A tank of compressed ethylene is connected by rubber tubing through a flowmeter to one branch of the T-tube. A filtered supply of compressed air is connected by rubber tubing through another flowmeter to the remaining branch of the T-tube. Pressure-regulating and flow-control valves are positioned in the ethylene and air supply lines.

The five reactors are mounted on a rack in such a way that all are immersed in the same thermostated water bath, through which positive circulation of water is provided by an outside pump.

The packing materials for the reactor tubes consisted of carbon, the same carbon treated with PTFE to form a Contacogen, or glass spheres 4mm. in diameter, respectively, as detailed below. Palladium chloride solution was added to each of the respective carbon or Contacogen packing materials, mixed thoroughly, and evaporated to dryness. The carbon or Contacogen packings, with dried palladium chloride on them, were added to the respective tubes and rinsed several times with fresh portions of the solution to be used in that reactor tube, after which the tube was drained and the measured amount of fresh solution put in. The reactor tubes were charged as follows:

Reactor No. 1:     30 g of carbon, 0.62 g of $PdCl_2$ on carbon,

-continued

Reactor No. 2: and 35 ml. of 0.2N HCl solution.
30 g of Contacogen consisting of carbon with 5% PTFE, 0.62 g. of PdCl₂ on Contacogen, and 35 ml. of 0.2 N HCl solution.

Reactor No. 3: 30 g of Contacogen consisting of carbon with 5% PTFE, 0.62 g of PdCl₂ on Contacogen, and 35 ml of solution 0.2 N HCl and 0.5M CuCl₂.

Reactor No. 4: 80 g of 4 mm glass spheres, and 35 ml of a solution of 0.1 M PdCl₂ and 0.2 N HCl.

Reactor No. 5: 80 g of 4 mm glass spheres, and 35 ml of a solution of 0.1 M PdCl₂, 0.2 N HCl, and 0.5 M in CuCl₂.

The reactors were clamped in position on the mounting rack, lowered into the thermostated water bath, the top stoppers positioned, with their attachments, flow of cooling water through the reflux condensers started, and flow of the mixture of ethylene and air through the gas diffusers at the bottoms of the tubes adjusted. Gas flow rates were adjusted so that 16cc/min of ethylene and 64 cc/min of air were passing through each reactor. The temperature of the water bath was 60° C.

Samples were taken from the vent tubes of each reactor at measured time intervals, and the performance of the reactor is characterized by the analysis of this vent gas. The gas samples were injected into a gas chromatograph, and the analysis performed in accordance with established principles of recording, calibrating and measuring gas chromatograms.

The results of this experiment are tabulated below.

| Hours after Start-Up | Reactor Number | | | | |
|---|---|---|---|---|---|
| | 1 | 2 | 3 | 4 | 5 |
| | Rate of Acetaldehyde Production — mg/min. | | | | |
| 1 | 0.42 | 6.50 | 2.46 | 0.91 | 0.66 |
| 2 | 0.72 | 7.19 | 2.78 | 0.69 | 0.65 |
| 4 | 0.83 | 6.61 | 2.68 | 0.19 | 0.65 |
| 20 | 0.63 | 6.05 | 3.46 | 0.02 | 0.59 |
| 26 | 0.61 | 5.44 | 4.69 | 0.02 | 0.59 |
| | Cumulative Total of Acetaldehyde Produced — mg. | | | | |
| 26 | 996 | 9447 | 5624 | 143 | 935 |
| | Cumulative Theoretical Yield Based on Ethylene — mole percent | | | | |
| 26 | 2.2 | 21.5 | 12.8 | 0.3 | 2.1 |

The performance of the reactors is seen to be fairly stable relative to each other. The two reactors containing Contacogen, Numbers 2 and 3, produce acetaldehyde at conspicuously greater rates than do the others, by factors in the range of 5 to 10 fold. The Contacogen, in reactor Number 2, and activated carbon, in reactor Number 1, apparently have the capability of causing palladium chloride to be regenerated, without the redox salt cupric chloride. Glass spheres, by contrast, do not have this capability, and the performance of reactor Number 4 indicates that reaction in it to form acetaldehyde will cease when the original supply of palladium chloride is once reduced to palladium. For comparison, 154 mg. is the amount of acetaldehyde which would theoretically be produced by the one-time reduction of the palladium chloride present in each reactor.

The role of the redox salt cupric chloride is not clear, considering the demonstrated ability for carbon or Contacogen to cause the regeneration of palladium chloride in the absence of the cupric chloride. On the other hand, there is an indication above, corroborated in subsequent examples, that the performance of the reactor containing Contacogen with cupric chloride is improving with time, while the performance of the reactor containing Contacogen without cupric chloride is either staying the same or slowly declining with time. Possibly the positions of cupric chloride and palladium relative to the PTFE/carbon boundaries on the Contacogen surface are gradually improving with time to minimize the transport distances of the molecules participating in the known sequence of reactions, and furthermore allowing the oxidative power of the air/Contacogen interfaces to react simultaneously to the oxidative power of the cupric chloride in maintaining most of the palladium in an oxidized condition favorable for the formation of the initiating palladium (II) ethylene complex. At the same time, the cuprous chloride product, because of its proximity to the air/Contacogen interface, can readily be oxidized to regenerate cupric chloride.

EXAMPLE 2

Acetone from Propylene

The same apparatus and procedure were used in this experiment as in the experiment described in Example 1. The packings used in the reactors were prepared in the same way as were those described in Example 1, but fresh, unused materials were employed.

The reactor tubes were charged as follows:

Reactor No. 1: 30 g of carbon, 0.62 g of PdCl₂ on carbon, and 35 ml. of 0.2 N HCl solution.

Reactor No. 2: 30 g of Contacogen consisting of carbon with 5% PTFE, 0.62 g of PdCl₂ on Contacogen, and 35 ml. of 0.2 N HCl solution.

Reactor No. 3: 30 g of carbon, 0.62 g of PdCl₂ on carbon, and 35 ml. of solution 0.2 N HCl and 0.5 M CuCl₂.

Reactor No. 4: 30 g of Contacogen consisting of carbon with 5% PTFE, 0.62 g of PdCl₂ on Contacogen, and 35 ml. of a solution 0.2 N HCl and 0.5 M CuCl₂.

Reactor No. 5: 80 g of 4 mm glass spheres, and 35 ml. of a solution 0.1 M PdCl₂, 0.2 N HCl, and 0.5 M CuCl₂.

As before, the carbon used to prepare Contacogen, by treatment with PTFE, is the same brand, and from the same package, as the carbon without PTFE treatment. A tank of compressed propylene was substituted for the tank of ethylene used in Example 1. The reactor tubes were charged, mounted, connected and started up exactly as in the experiment described in Example 1. Gas flow rates were adjusted so that 16 cc/min of propylene and 64 cc/min of air were passing through each reactor. The results of this experiment are tabulated below.

| Hours after Start-Up | Reactor Number | | | | |
|---|---|---|---|---|---|
| | 1 | 2 | 3 | 4 | 5 |
| | Rate of Acetone Production — mg/min. | | | | |
| 3 | 0.00 | 0.93 | 0.04 | 0.47 | 0.21 |
| 20 | 0.39 | 1.93 | 0.45 | 1.68 | 0.15 |
| 26 | 0.25 | 1.78 | 0.38 | 1.88 | 0.11 |
| 44 | 0.35 | 1.87 | 0.71 | 2.25 | 0.15 |
| | Cumulative Total of Acetone Produced — mg. | | | | |
| 44 | 850 | 4800 | 1320 | 5000 | 362 |
| | Cumulative Theoretical, Yield based on Ethylene — mole percent | | | | |
| 44 | 0.89 | 5.02 | 1.38 | 5.23 | 0.38 |

The performance of the reactors relative to each other is fairly stable. The two reactors containing Contacogen, Numbers 2 and 4, produce acetone at conspicuously greater rates than do the others, by factors in the range of 5 to 10 fold. For comparison, 203 mg. is the amount of acetone which would theoretically be produced by the one-time reduction of the palladium chloride present in each reactor. Contacogen, in reactor Number 2, and carbon, in reactor Number 1, apparently have the capability of causing palladium chloride to be regenerated without cupric chloride. The rate of production of acetone is increasing with time when cupric chloride is present with Contacogen, reactor Number 4, whereas the rate is substantially unchanged with time after an initial period when Contacogen is present without cupric chloride, reactor Number 2. During the time period of 44 hours, however, the presence or absence of cupric chloride in reactors containing Contacogen is nearly without effect on the total production of acetone.

EXAMPLE 3

Methyl Ethyl Ketone from 1-Butene

The same apparatus and procedure were used in this experiment as in the experiment described in Example 1. The packings used in the reactors were prepared in the same way as were those described in Example 1, but fresh, unused materials were employed. The reactor tubes were charged in the same manner as listed in Example 2. As before, the carbon used to prepare Contacogen, by treatment with PTFE, is the same brand, and from the same package, as the carbon without PTFE treatment.

A tank of compressed 1-butene was substituted for the tank of ethylene used in Example 1. The reactor tubes were charged, mounted, connected and started up exactly as in the experiment described in Example 1. Gas flow rates were adjusted so that 16 cc/min of 1-butene and 64 cc/min of air were passing through each reactor. After the reactors were operated for 68 hours at 60°C, the temperature in the water bath were raised to 80°C and operation were continued for another six hours. The results of this experiment are tabulated below.

| Hours after Start-Up | Reactor Number | | | | |
|---|---|---|---|---|---|
|  | 1 | 2 | 3 | 4 | 5 |
| Rate of Methyl Ethyl Ketone Production at 60°C — mg | | | | | |
| 2 | .03 | .56 | .05 | .24 | .21 |
| 26 | .22 | 1.46 | .48 | 2.25 | .17 |
| 45 | .23 | 1.32 | .78 | 3.13 | .13 |
| 68 | .20 | 1.37 | .13 | 3.26 | .19 |
| Cumulative Total of Methyl Ethyl Ketone Produced — mg | | | | | |
| 68 | 860 | 5560 | 1760 | 11340 | 680 |
| Cumulative Theoretical Yield Based on 1-Butene — mole percent | | | | | |
| 68 | 0.5 | 2.9 | 0.9 | 6.0 | 0.4 |
| Rate of Methyl Ethyl Ketone Production at 80°C — mg | | | | | |
| (74) 6 at 80° | .24 | 1.41 | 1.24 | 4.16 | .27 |

The two reactors containing Contacogen, Numbers 2 and 4, produce methyl ethyl ketone at greater rates than do the others, by factors in the range of 5 to 10. The amount of methyl ethyl ketone which would theoretically be produced by the one-time reduction of the palladium chloride present in each reactor is 252 mg.

EXAMPLE 4

Methyl Ethyl Ketone from 2-Butene

This experiment is the same as in the experiment described in Example 3, with regard to apparatus, procedure, materials and charging of the reactors. The only difference is that a tank of compressed 2-butene was substituted for the tank of 1-butene used in Example 3. The results of this experiment are tabulated below.

| Hours after Start-Up | Reactor Number | | | | |
|---|---|---|---|---|---|
|  | 1 | 2 | 3 | 4 | 5 |
| Rate of Methyl Ethyl Ketone Production at 60° — mg | | | | | |
| 3 | .00 | .58 | — | .12 | .00 |
| 22 | .29 | 1.94 | .10 | 1.26 | .09 |
| 27 | .31 | 1.73 | .16 | 1.63 | .18 |
| 45 | .40 | 1.79 | .56 | 2.34 | .12 |
| Cumulative Total of Methyl Ethyl Ketone Produced — mg | | | | | |
| 45 | 860 | 4770 | 770 | 4470 | 290 |
| Cumulative Theoretical Yield Based on 2-Butene — mole percent | | | | | |
| 45 | 0.7 | 3.9 | 0.6 | 3.6 | 0.3 |
| Rate of Methyl Ethyl Ketone Production at 80° — mg | | | | | |
| (49) 4 at 80° | .65 | 1.77 | 1.46 | 2.88 | .28 |

The reactors containing Contacogen, Numbers 2 and 4, produce methyl ethyl ketone from five to fifteen times faster than do the others.

While the processes herein described constitute preferred embodiments of the invention, it is to be understood that the invention is not limited to these precise processes, and that changes may be made therein without departing from the scope of the invention which is defined in the appended claims.

What is claimed is:

1. In a Wacker-type process for the production of a carbonyl compound from olefinically unsaturated hydrocarbon gas in which said hydrocarbon gas is oxidized in the presence of an aqueous catalyst, the improvement comprising:
   a. introducing said aqueous catalyst into a reaction chamber containing a bed of wetproofed solid particulate material selected from the group consisting of wetproofed carbon particles and wetproofed activated carbon particles,
   b. introducing said hydrocarbon gas and a gaseous oxidant into said reaction chamber and into contact with said wetproofed solid material and said catalyst to form a reaction mixture of said hydrocarbon gas, catalyst and oxidant,
   c. maintaining said reaction chamber at a sufficiently low temperature and pressure to prevent formation of vapor phase conditions,
   d. maintaining at least a portion of said catalyst and at least a portion of said hydrocarbon gas and oxidant in said reaction mixture simultaneously in contact with each other and simultaneously in contact with said wetproofed solid material to effect production of said carbonyl compound, and
   e. separating said carbonyl compound from said reaction mixture.

2. The process as set forth in claim 1 wherein said wetproofed solid material is activated carbon particles wetproofed with polytetrafluoroethylene.

3. The process as set forth in claim 1 wherein said hydrocarbon gas is selected from the group consisting of ethylene, propylene, butene-1, butene-2, and 1, 3, butadiene, said carbonyl compound being selected from the group consisting of acetaldehyde, acetic acid, methyl ethyl ketone, croton-aldehyde, proprionaldehyde and acrolein.

4. The process as set forth in claim 3 wherein said wetproofed solid material is activated carbon particles wetproofed with 0.1 to 100% by weight polytetrafluoroethylene supported in a column, and wherein said oxidant gas is air, said hydrocarbon gas and air being admixed and introduced simultaneously into said column for contact with said catalyst and said wetproofed solid material.

5. The process as set forth in claim 4 wherein said hydrocarbon gas contains ethylene, wherein said catalyst is palladium chloride in an aqueous solution of a hydrochloric acid, and wherein said carbonyl compound is acetaldehyde.

6. The process as set forth in claim 1 wherein said conversion is conducted at a temperature below about 150°C and at a pressure of 5 atmospheres or less.

7. The process as set forth in claim 5 wherein the oxidant gas is air and the ratio of olefin to air is in the range of 8:5 to 1:5.

* * * * *